United States Patent [19]

Issod

[11] Patent Number: 5,320,246
[45] Date of Patent: Jun. 14, 1994

[54] TRUNCATED KETTLE ADAPTED FOR USE AS A STEAMER

[76] Inventor: Craig Issod, 217 Atsion Rd., Medford, N.J. 08055

[21] Appl. No.: 990,608

[22] Filed: Dec. 14, 1992

[51] Int. Cl.⁵ .............................................. B65D 25/02
[52] U.S. Cl. ..................... 220/603; 222/463; 222/478; 220/660
[58] Field of Search ...................... 222/465.1, 478, 463; 215/1 R, 6; 99/300, 293, 294; 220/912, 603, 660

[56] References Cited

U.S. PATENT DOCUMENTS

| | | | |
|---|---|---|---|
| 14,641 | 4/1856 | Priestly | 222/463 |
| 261,357 | 7/1882 | Kaye | 222/463 |
| 278,569 | 5/1883 | Lipscomb | 222/465.1 |
| 301,403 | 7/1884 | Taylor | 222/463 |
| 1,577,781 | 3/1926 | Adams | 220/23.4 |
| 1,599,967 | 9/1926 | Johnson | 222/465.1 |
| 1,633,022 | 6/1927 | Jacobs | 220/23.4 |
| 2,738,893 | 3/1956 | Quinones, Jr. | 220/23.4 |
| 4,388,996 | 6/1983 | Panicci | 220/603 |
| 4,991,734 | 2/1991 | Nilsson et al. | 220/623 |
| 5,135,128 | 8/1992 | Kuhn | 220/912 |

FOREIGN PATENT DOCUMENTS 606138  6/1960  Italy ........................................ 215/6

Primary Examiner—Stephen P. Garbe
Assistant Examiner—S. Castellano
Attorney, Agent, or Firm—Abdallah & Muckelroy

[57] ABSTRACT

A kettle is adapted for use on a narrow ledge of a wood, pellet, or coal burning stove or the like by flattening one side and providing substantially greater weight per unit area to the flattened side and bottom such that the center of gravity of the kettle is located in the vicinity of the juncture between the bottom and the flattened side. A spout for the kettle is adapted with an opening which points horizontally away from the flattened side to direct steam to a space in front of the stove and thereby minimize damage from steam otherwise rising directly upward and depositing moisture on adjacent or nearby stove pipes or parts.

1 Claim, 2 Drawing Sheets

TRUNCATED KETTLE ADAPTED FOR USE AS A STEAMER

BACKGROUND OF THE INVENTION

1. Field of the Invention

This invention relates to improvements to a conventional kettle, tea kettle, steamer, or covered spouted pot.

2. Description of the Prior Art

Apparatus exists in the prior art primarily for use in the heating of rooms, namely, space heaters. Space heaters are free standing fireplace versions of heaters fueled by wood, coal, fuel, pellets, gas, propane, heating oil and the like. These space heaters are used today to conserve energy and to efficiently heat rooms and other spaces within homes. These space heaters are also used in restaurants to decorate foyers and waiting areas. The water heated in the prior art apparatus serves to humidify the room and surrounding areas and prevent drying of the sinuses and nasal passages. Thus, the steam produced from the heating and boiling of water in a vehicle on a space heater or free standing fireplace offsets the dry heat produced by many room heaters.

One problem with the prior art kettles and pots used to provide humidity is that those available are not adapted to be placed on tope of a space heater or free standing fireplace or stove. Accordingly, the consuming public has resorted to various containers which open upward and rapidly deplete the water content and often result in burning and overheating of the receptacle. Another problem with these open receptacles is that the volume of steam released upwards is so great that sometimes damage is done to the ceiling of the room in which they are used and to the piping or portion of the structure above the ledge or flat surface on which these open top vehicles are placed for heating.

Another problem with these open top vehicles and receptacles is that oftentime they do not have handles. Thus, when a user attempts to remove a receptacle to replenish the water therein burning sometimes occurs or spillage. Sometimes these improvised containers are made of a breakable material and in the process of removing the container for refilling they are dropped and broken because of their being overheated and there being no handle available to facilitate picking up and moving the container.

In 1903 Doggett received U.S. Pat. No. 748,052 which disclosed a receptacle preferably formed with a vertical wall. The vertical wall is used to facilitate attachment of another receptacle with a mating flat wall. In 1927 Jacobs received U.S. Pat. No. 1,633,022 which disclosed a carrier frame or skeleton construction adapted to receive several sectional buckets or receptacles adapted with flat walls to nest together in the carrier frame. The patent suggests that one of the sectional buckets may be removed for the purpose of replenishing the contents thereof without disturbing the other flat wall buckets in the carrier frame. In FIG. 2 is disclosed a bucket with an open top and one side flattened.

In 1926 Adams was issued U.S. Pat. No. 1,577,781 for a cooking utensil made of a plurality of segmental sections. In FIG. 5 there is shown one section of two flat walls and a spout which opens upward.

In 1909 Geig was issued U.S. Pat. No. 927,521 for a cooking utensil comprising a plurality of receptacles in a carrier skeleton with at least one of the receptacles having one side flattened and further having a handle and a top. In 1956 Quinones was issued U.S. Pat. No. 2,738,893 for double bucket, namely, a pair of similar receptacles detachably interconnected each with a flat side wall, a flat bottom and open top, and semicylindrical side wall. The art further progressed in 1987 when Horvath was issued U.S. Pat. No. 4,651,900 for a "Dual Compartment Serving Pot". This pot included a pair of pot halves having substantially flat inner walls. The flat sided pot halfs each has an opening fully covered by a lid member. The patent further disclosed a spout extending above the movable lid and opening upwards. A somewhat similar container was patented in 1989 by Bouldin, U.S. Pat. No. 4,802,406. There is disclosed a pair of containers each having a flat side wall and a semicylindrical side wall as well as an upwardly open top.

The device shown in the prior art patents address the broad concept of a container having a flattened side wall for the distinct purpose of juxtaposing or attaching that side wall to another receptacle having a mating flattened side wall. However, the prior art does not address utilizing a flattened side wall for the purpose of placement and retainment on a narrow ledge or the weighting of the bottom and side wall to shift the center of gravity to or near the flattened side wall and away from the front of the ledge. Further, the prior art collectively discloses receptacles which either provide a lid which completely seals the receptacle or an opening which opens upward and does not address a structural means for directing steam from liquids boiled in the receptacle in a direction other than upwards.

SUMMARY

In accordance with one aspect of the invention a kettle is provided with a flattened side wall contiguous to a cylindrical side wall and flat bottom and a spout which is directed not vertically but horizontally and perpendicularly away from the flattened side wall. The kettle is adapted with a larger aperture and covering lid for putting therein and a handle for easily mobilizing the kettle.

OBJECTS OF THE INVENTION

It is therefore an object of the invention to provide a kettle capable of standing on a narrow ledge or flat space on top of a space heater, free standing fireplace or wood burning stove or the like. It is another object of the novel invention to provide a vehicle for heating water to provide humidity in a room heated by a space heater, free standing fireplace, stove, or the like which although it has one flattened side wall otherwise retains the look and charm of a usual and customary kettle or pot.

It is yet another object of the invention to provide a novel structure for a tea kettle wherein the spout deflects steam in a horizontal forward direction and thereby reduces rusting and wetting of surfaces above and adjacent customary kettles placed on stoves or free standing fireplace inserts and ledges.

It is yet a further additional object of the invention to provide a novel kettle wherein the flattened rear surface and the bottom are weighted by being made thicker, for example, than the remainder of the kettle, namely the semicylindrical wall and top such that the center of gravity of the kettle is in the vicinity of the juncture between the flat side wall and the bottom.

It is also an additional object of the invention to provide a novel kettle whereby the weighting of the bottom and the flattened side wall acts in conjunction with a handle for lifting the kettle whereby the weighting of the bottom counterbalances the weighting of the flattened side wall to provide a center of gravity in the vertical plane of the kettle handle.

It is yet another additional object of the invention to provide a novel means for counterbalancing the additional weight of the vertical flattened side wall with a removable flat item such as a trivot attachable to the bottom of the kettle so as to counterbalance the weight of the flattened side wall to assure that the kettle maintains its vertical orientation when lifted by its handle.

BRIEF DESCRIPTION OF THE DRAWINGS

The drawings illustrate the best mode presently contemplated for carrying out the essential features novel to the invention.

In the drawings.

DESCRIPTION OF THE PREFERRED EMBODIMENT

Figure 1:
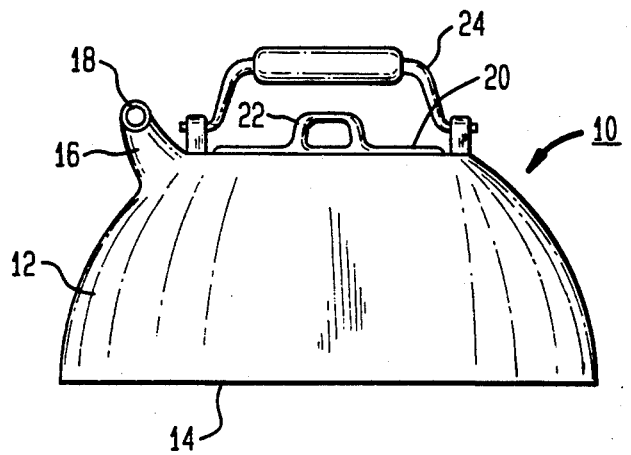
FIG. 1 is a front view of a novel kettle formed according to the invention.

As shown in FIG. 1, a novel kettle 10 according to the invention includes a nonflat semicylindrical side wall 12 contiguous with a flat bottom 14. Extending from the nonflat side wall 12 is a spout 16 which extends upward and then horizontally to a horizontally opening aperture 18. The kettle 10 has a larger aperture 20 covered by a removable lid 22. A handle 24 is attached to the kettle 10.

Figure 2:
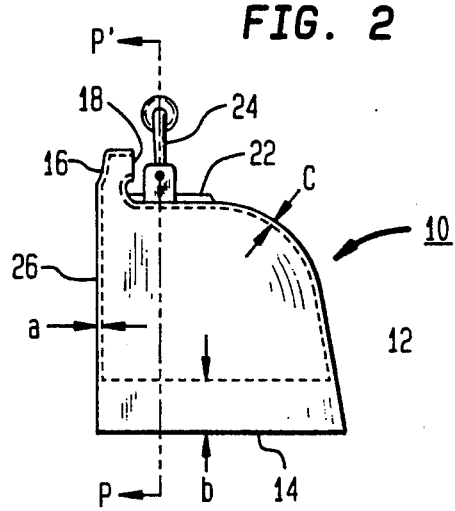
FIG. 2 is a left side view of the novel kettle of FIG. 1.

Referring now to FIG. 2 there is shown the kettle 10 with its semicylindrical side wall 12, flat bottom 14 and a contiguous flattened or flat rear wall 26. The aperture 18 is shown extending perpendicularly away from the flat side wall 26. Detailed aspects of the spout 16 are shown wherein it extends upwards vertically and then horizontally away from the side wall 26. Note that the thickness of the flattened vertical side wall 26 is illustrated as "a" and the thickness of the bottom 14 is illustrated as "b" whereas the thickness of the remainder of the kettle 10 is illustrated generally as a thickness "c".

In the preferred embodiment "b" is greater than "a", and "c" is less than "a" or "b". The specific dimensions of "a", "b" and "c" may change and may be selected from a variety of parameters.

The thickness for the parameter "b" is always greater than the thickness of the parameter "a" and is selected such that the center of gravity for the kettle is substantially within a plane illustrated as p—p'. this plane p—p' is the plane defined by the lateral aspect of the handle 24 within the position illustrated in FIGS. 1 and 2. A typical example of the kettle 10 according to the invention is when the bottom of the tea kettle is defined by one half of an elipse divided along its great axis wherein the greater axis is 8.5 inches and the minor axis is 8 inches. Further, the distance from the bottom 14 to the uppermost point of the spout 16 is 5.5 inches, the height of the flattened side wall 26 is 4.5 inches, and the parameters "a", "b" and "c" are 4.5 millimeters, 5 millimeters, and 4 millimeters, respectively.

The distance from the top of the nonflat surface of the kettle 10 shown in FIG. 2 to the uppermost aspect of the handle 24 with the foregoing parameters is preferably 3.5 inches and the handle preferably weighs between about 1 ounce and 5 ounces.

Figure 3:
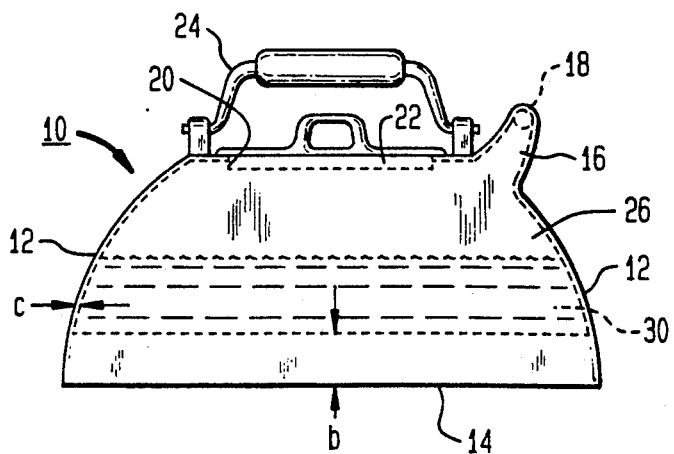
FIG. 3 is a rear view of the novel kettle of FIG. 1.

Shown in FIG. 3 is a rearview of the kettle 10 from the aspect of the flat wall 26. The kettle 10 is preferably made of a material selected from the group consisting of iron, brass, aluminum, copper, stainless steel, or an enameled aspect of the first four.

As shown in detail in FIG. 3 lid 22 is adapted to removably seal the aperture 20. As illustrated the aperture 20 is substantially greater than the aperture 18 at the end of the spout 16. Further, the thickness of the bottom 14 is illustrated as substantially greater than the thickness of the nonflat side wall 12 shown in FIG. 3 as having a thickness "c". There is shown within and contained within the kettle 10 a quantity of a liquid, for example, water 30.

Figure 5:
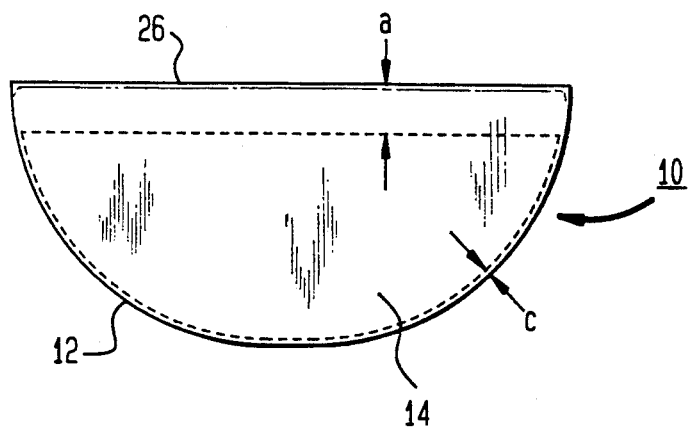
FIG. 5 is a bottom view of the novel kettle of FIG. 1.

In FIG. 3 the bottom 14 is required to be of sufficient thickness such that it may be separated into two parts (not shown), namely a bottom which is an integral portion of the kettle 10 and another removable part which attaches to the bottom of the kettle by any number of means such as for example clamps, or a tongue and groove slot arrangement. Such a removable bottom may conform to the shape of the bottom of the kettle 10 as shown in FIG. 5 or may assume a variety of other shapes for decorative or design purposes. It may be separately usable as a trivet in addition to its function to counterbalance to insure the center of gravity of the kettle 10 falling within the plane p—p' wherein the handle 24 is located.

Figure 4:
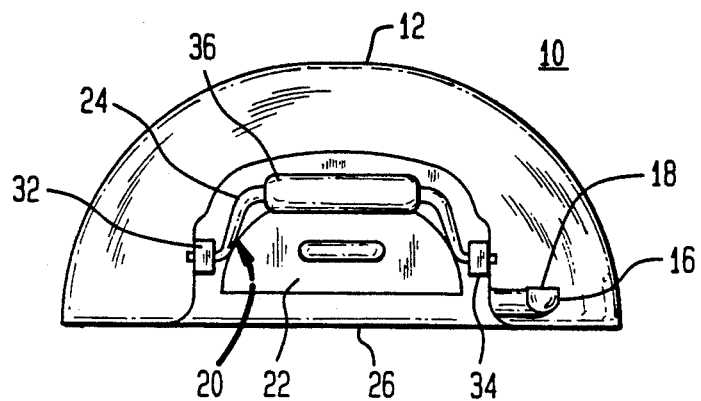
FIG. 4 is a top view of the novel kettle of FIG. 1.

In FIG. 4 there is shown a top view of the kettle 10 wherein the lid 22 is shown sealing the large aperture 20. The spout 16 is shown extending upwards and then horizontally to an opening 18 which points perpendicular away from the side wall 26. The handle 24 is shown pivoted towards the nonflat side wall 12. The handle 24 is retained in brackets 32 and 34 forming an integral part of the kettle 10. A portion 36 of the handle 24 is preferably made of a heat insulating material to facilitate picking up the kettle 10 with minimal conduction of heat to the portion 36 from the kettle 10.

Finally, there is shown in FIG. 5 a bottom view of the kettle 10 wherein the nonflat side wall 12 is shown contiguous with the bottom 14 and the flat side wall 26. Further illustrated is the thickness "a" for the side wall 26 and the thickness "c" for the nonflat side wall 12. The illustration is such that the thickness "a" is greater than the thickness "c".

It is to be understood that further modifications and alterations of the embodiment shown and alternative embodiments of the kettle and/or steamer described for this invention will be apparent for those skilled in the art in view of this description. Accordingly, this description is to be viewed as illustrative only of the preferred embodiment at this time and for the purpose of teaching those skilled in the art the manner of carrying out the invention including the importance of the center of gravity of the novel invention being located in the plane of the handle. It is to be understood that the forms of the invention herewith shown and described including the thick bottom, whether by detachable trivet or not, are the presently preferred embodiments. Various changes may be made in the shape, size and arrangement of the parts. Equivalent elements or materials may be substituted for those illustrated and described herein, parts may be reversed, and certain features of the invention may be utilized independently of the use of other features. All of this as would be apparently to one skilled in the art after having the benefit of this description and thus the inventor in this instrument relies upon the doctrine of equivalents for his claims as set forth below, to wit:

What is claimed is:

1. A kettle comprising a substantially flat bottom having an upper surface and a lower surface, a flat sidewall contiguous to said bottom, a center of gravity, a nonflat sidewall contiguous to said bottom and said flat sidewall, a first aperture opening upwards, a removable top temporarily sealing said first aperture, a handle attached to said kettle, a spout connected to said kettle adjacent to said flat sidewall, a second aperture located at said spout, said second aperture being substantially smaller than said first aperture, said second aperture having an opening, said opening having a face, said face being substantially vertically oriented above the removable top of said kettle, said face pointing in a substantially horizontal direction towards a plane extending through the center of gravity and extending parallel to said flat sidewall, said opening facing horizontally away from said flat sidewall, the kettle being made such that the bottom and the flat sidewall are each of about the same surface area and are each substantially heavier than the nonflat sidewall per equal unit of surface area and the bottom is substantially heavier than the flat sidewall per equal unit of surface area and a juncture between the flat sidewall and the bottom, said center of gravity located between the upper and lower surfaces of the bottom approximately at the juncture.

* * * * *